Feb. 9, 1932.  E. BODER  1,844,558
ELECTRICAL DISTANT CONTROL
Filed June 13, 1928   4 Sheets-Sheet 1

*Fig. 1ᵃ*

Ernst Boder
INVENTOR,
BY Morrison, Kennedy
& Campbell, ATTORNEYS.

Feb. 9, 1932.　　　　E. BODER　　　　1,844,558
ELECTRICAL DISTANT CONTROL
Filed June 13, 1928　　　4 Sheets-Sheet 2

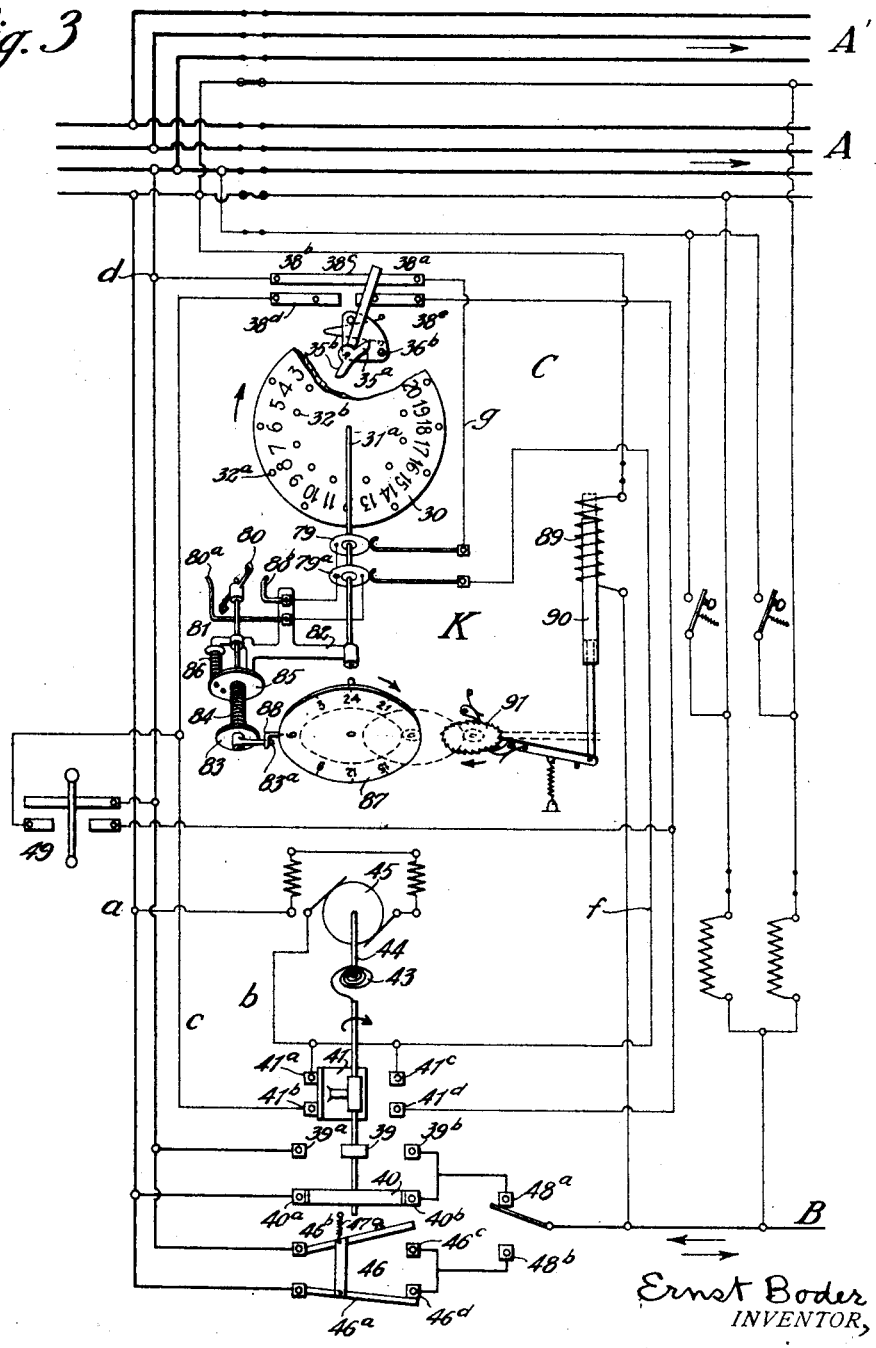

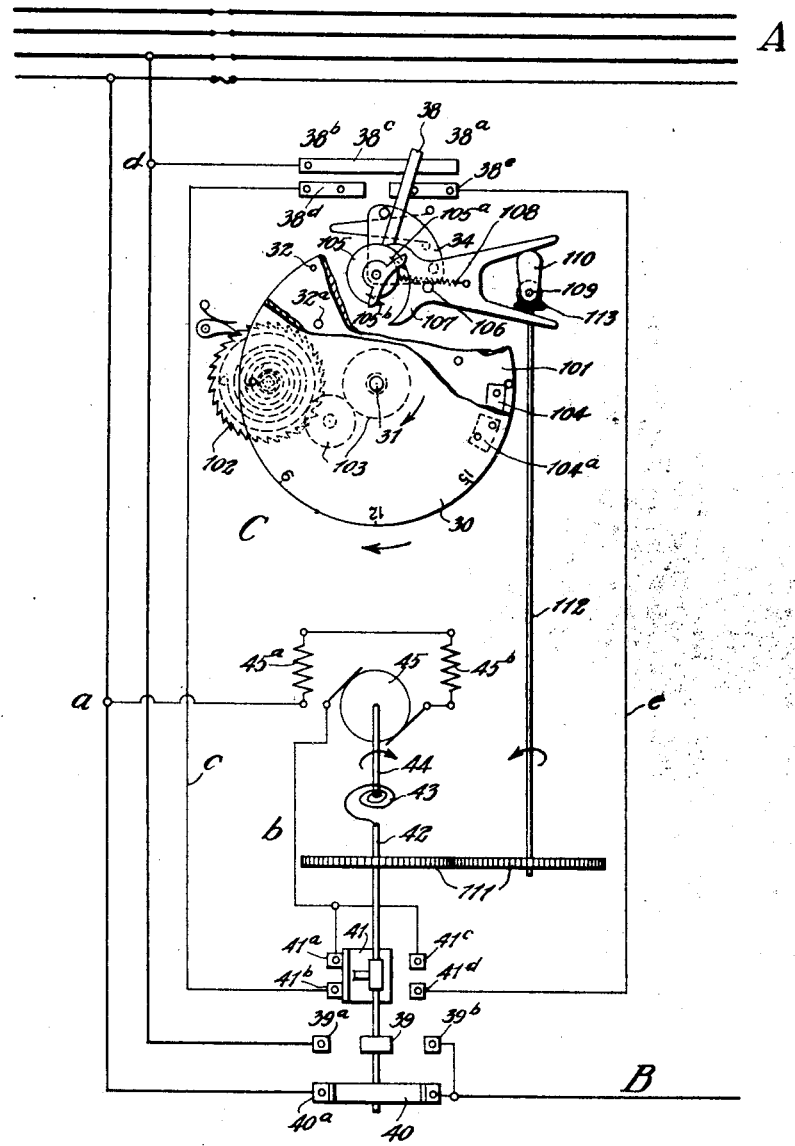

Patented Feb. 9, 1932

1,844,558

UNITED STATES PATENT OFFICE

ERNST BODER, OF OLTEN, SWITZERLAND

ELECTRICAL DISTANT CONTROL

Application filed June 13, 1928, Serial No. 285,196, and in Switzerland June 23, 1927.

The present invention relates to electrical distant control, and more particularly to a system for switching in or cutting out electric circuits, such for example as those for street lighting systems, or heating systems, or those for controlling the tariff changing relays of multiple tariff meters, and other apparatus subject to distant control.

The general objects of the invention are to provide a distant control method, system and apparatus which will be simple and inexpensive of construction and efficient and durable in use, and which will be automatic in action and substantially immune from injury. Other and more particular objects will be explained in the herein following detail description, or will be understood to those conversant with the subject matter. To the attainment of such objects and advantages the present invention consists in the novel electrical time control method, system and apparatus and the novel features of operation, arrangement and construction herein illustrated or described.

This system consists essentially of a central control mechanism, and the desired number of distant control relays, which latter are disposed at the places where the current is used and are controlled by electric impulses emitted from the control mechanism and transmitted through the usual network supplemented by one or more auxiliary conductors, which may be separate conductors or the ground. The central control mechanism, in the illustrated embodiment, comprises two switch bridges set at an angle of 90° to each other, on a common axle, actuated by an electric motor, or an electromagnet, or a driving spring mechanism, or the like, and is governed by a clock switch or a motor, and operates to establish at certain regular or definite time intervals the control circuit for the distant control relays, namely through one of the two switch bridges and the network and one or more auxiliary conductors, thereby operating the relays; thereupon the invention operates to cut out the relays by the other of the switch bridges, in such a way that after the distant control has been effected all relays are restored or again connected in a no-voltage or blocked circuit, so that any influencing of or damage to the distant control relays, whether accidentally or maliciously, is effectively prevented.

As stated, in another aspect the invention embodies the combination with the working lines of an electric distribution system, a control mechanism at a central point, and one or more relays at distant points each controlling a given supply or device, the central control mechanism being adapted to send out successive electric impulses independent of the working currents, and each relay being adapted to receive and be operated by such impulses.

The diagrammatic drawings show several illustrative methods of carrying the invention into practical effect.

Figs. 1 and 2 are to be taken together as a single diagram of a complete system.

Figures 3 and 4 show two modifications of central station apparatus with an automatic advancing switch for the distant control relays which switches are constructed as time discs; each of these figures intended to be combined with Fig. 2 in place of Fig. 1.

Figure 1:
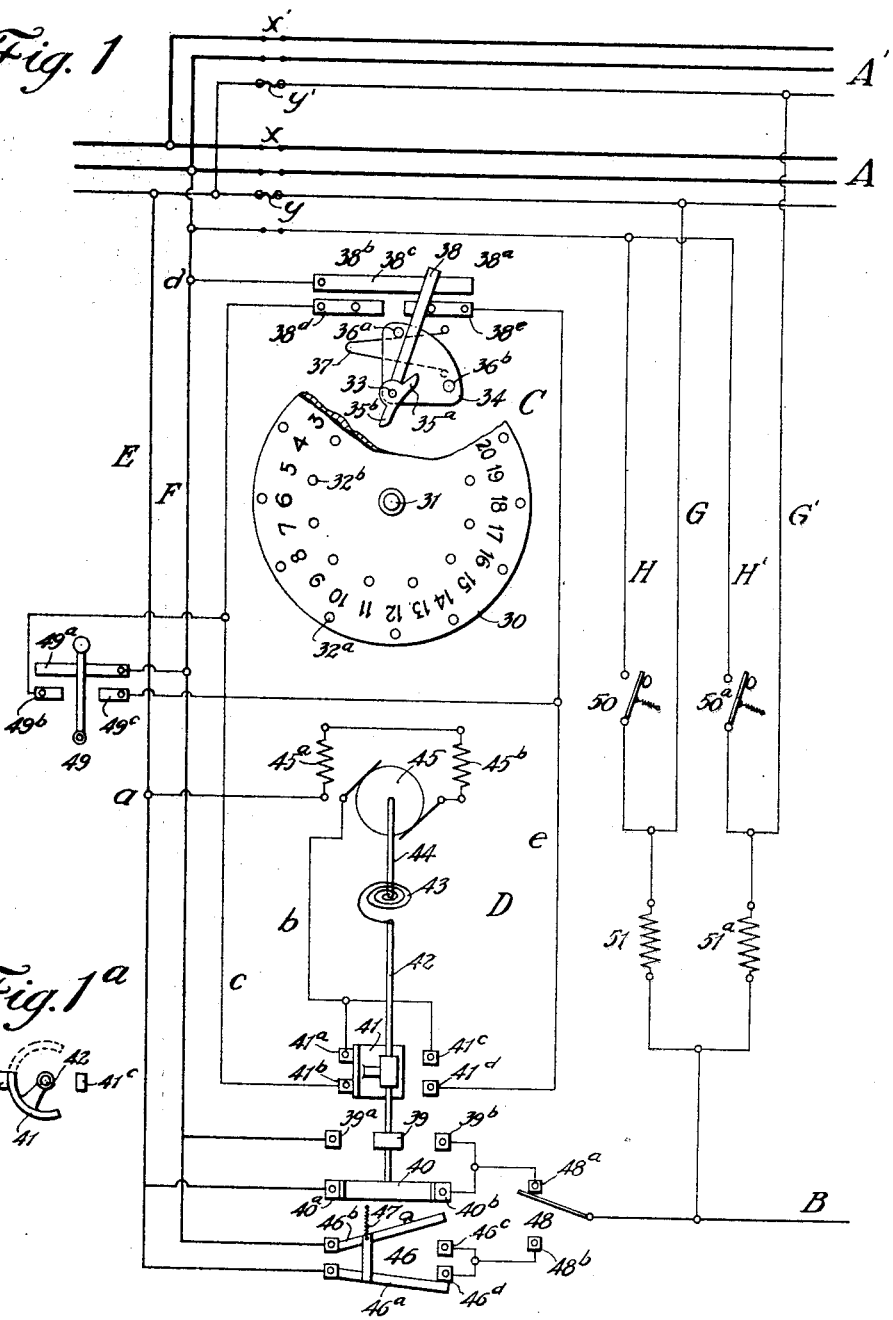
Figure 1 shows the control mechanism and the other parts at the central station; while Fig. 1ª shows an axial view of the part 41.
Figure 1:
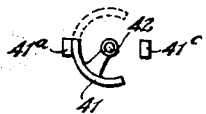
Figure 2:
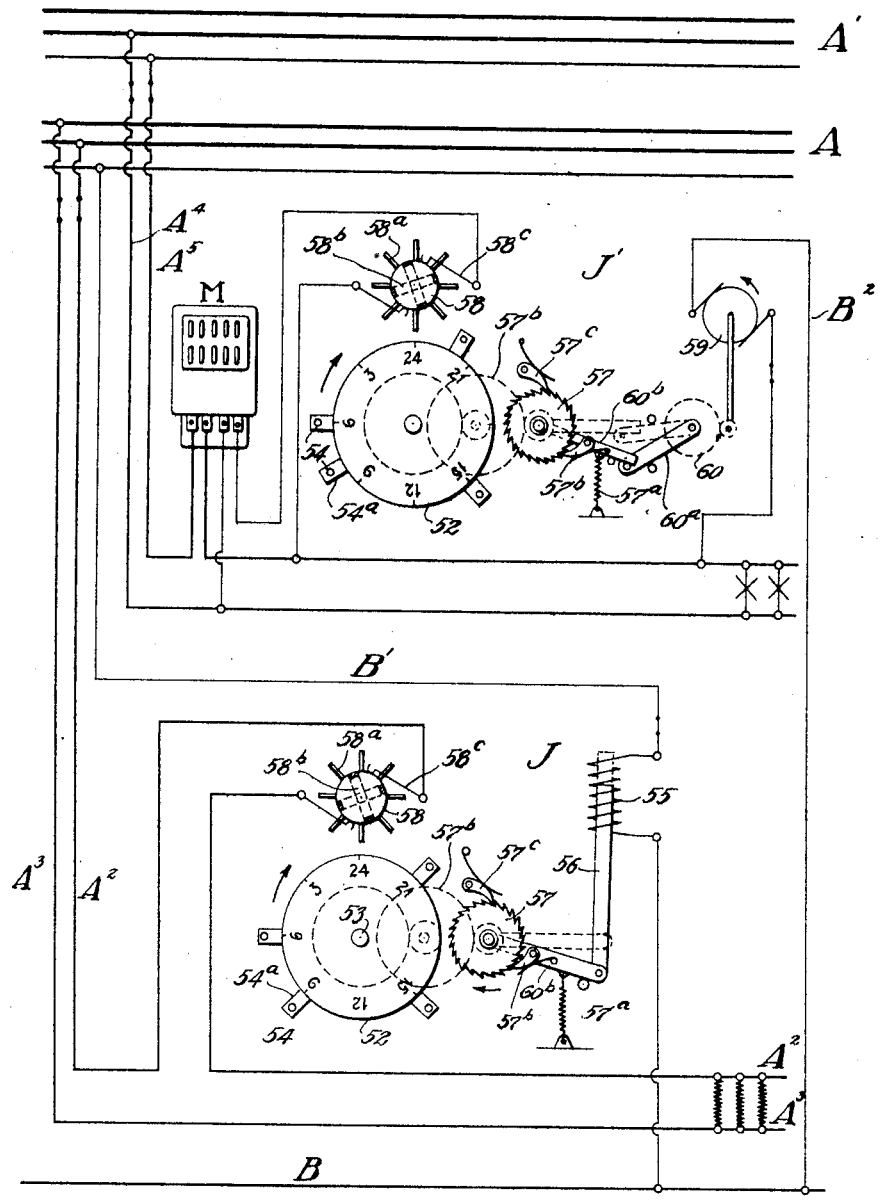
Figure 2 shows cooperating distant control relays, for example two of them at two places where the current is used; and there can be of course any desired number of such relays.

In Figure 1, A and A' indicate two feeders of the network, which lead to places where the current is used, while an auxiliary conductor B cooperates with one of the working conductors of each of the network feeders to constitute the distant control circuits. A clock switch C is shown in Fig. 1 which governs the motor driven control switch D. In Figure 2 two illustrative distant control relays J and J' are shown, each of which is connected at one side to the auxiliary conductor B and at the other side to one of the feeders A or A'.

The contact clock or clock switch C in Figure 1 consists of a time disc 30, rotated by a clock work mechanism or motor not shown, and which makes a complete revolution about the shaft 31 in the time of 24 hours, and carries a time scale with the hours 1 to 24 on it. The time disc 30 is provided with an outer and an inner circle of projecting switch operating pins $32^a$ and $32^b$ respectively, which as they turn engage with the fingers $35^a$ and $35^b$ of a spring change-over switch 34 and alternately swing the switch about the pivot 33 in known manner. A snap spring 37 is tensioned by each shift and causes the spring switch 34 to spring into one of its end positions when the dead point is passed. By this movement a contact arm 38 is carried along by the conveying studs $36^a$, $36^b$ of the spring switch 34 and is sprung into the switch positions $38^a$ and $38^b$. The contact arm 38 bridges the contact strip $38^c$ and the separate contacts $38^d$ and $38^e$.

Included with the motor driven control switch D there are two switch bridges 39 and 40 constituting contact levers set at an angle of 90° to each other, and which are fast on a rotatable operating shaft 42. Switch bridge 39 cooperates with fixed contacts $39^a$ and $39^b$, and bridge 40 with contacts $40^a$ and $40^b$. On the shaft 42 is also mounted an insulated contact segment 41 which alternately makes contact with the pairs of contact fingers $41^a$, $41^b$ and $41^c$, $41^d$. A spring coupling 43 is indicated, which becomes effective only after a sufficient tension has been imparted to it, and which connects the bridge switch shaft 42 with a drive or motor shaft 44. The shaft 44 is driven by a motor 45 whose field coils are indicated by $45^a$ and $45^b$.

For convenience there may be employed a manual switch 46 having two coupled switch arms $46^a$ and $46^b$ by means of which contact can be established alternately at $46^c$, and at $46^d$. This permits the switching function of the motor driven main switch D to be taken over for hand control in case damage or faults occur in the latter. A tension spring 47 returns the manual switch 46 into its normal position shown.

An ordinary change-over switch 48 allows the auxiliary conductor B to be manually connected either to the circuit of the motor driven switch bridges, or to that of the hand operated switch 46, by means of contacts $48^a$ and $48^b$.

In the control circuit is inserted a change-over switch 49 which can be manually operated, but which normally remains in the mid or zero position. This is designed for the temporary replacement of the clock switch C, if this should become inoperative, and it can also serve for emitting additional or correctional control impulses through the medium of the motor driven main switch D. The contacts $49^a$, $49^b$ and $49^c$ of the change-over switch 49 therefore are shunted across those of the clock switch C. It is possible however to provide a mechanical controller for the main switch D instead of the change-over switch 49.

50, $50^a$, are two manually operated auxiliary switches, and 51, $51^a$ are time control relays in the circuits of the feeders A and A' respectively. These elements serve to control the conditions in the network and can also be used for corrective or additional electrical adjustment of the relays of individual feeders. The master relays 51, $51^a$ are illustrated only by coils, but are to be understood as being complete relay mechanisms, for example like J or J' in Fig. 2, with time disks indicating the positions of the distant ones to be described.

In Figure 2 the distant control relay J is operated through the feeder A and supplemental conductor B, and is shown consisting of a rotary time disc 52 which can turn about the shaft 53 and carries on its periphery one or more detachable and adjustable clips $54^a$ with projecting operating pins or trips 54, four being shown. The time disc 52 can be methodically rotated in step by step manner through a periodically excited electromagnet or solenoid shown as a coil 55, which when excited by a current impulse operates to attract or pull the iron core 56, and releases it again after the cessation of the current, whereupon the switch operating wheel or ratchet 57 is turned about a certain angle in the direction of the arrow by means of the spring $57^a$. The wheel 57 transmits its rotary motion to the time disc 52 by means of gears $57^b$, which may afford a reduction of motion.

The rotary motion of the time disc 52 is transmitted by the switch operating trips or pins 54 to a rotary contact wheel or cylinder 58 provided with projecting fingers or spokes $58^a$. The pins 54, as they rotate, engage with the spokes of the rotary cylinder or switch 58, and turn the latter with a step by step motion, so that the swich 58 is moved alternately into its on and off switch positions, the strips $58^b$ indicating metallic contacts, engageable by a pair of brushes $58^c$. In a heating circuit for instance the current is thus switched on and off twice in the 24 hours, with the use of four trips, namely at the hours to which the trips are set.

It will be understood that the switch 58 is inserted in one of the lateral conductors $A^2$, $A^3$ extending from two working conductors of the feeder A, and leading to the place of local consumption of current; indicated as heating units, thus controlling the desired portion of the network; while the coil 55 is energized by conductor B' connected between the feeder A, for example its neutral conductor, and the supplemental conductor or ground B.

The other distant control relay J' is operated by a motor instead of an electromagnet. The motor 59 is connected by conductor $B^2$ between the auxiliary conductor B and one of the lateral or branch conductors $A^4$, $A^5$ extending from feeder $A'$. When a current impulse is transmitted through this control circuit, the motor rotates a gear 60 and thus moving the radial arm $60^a$ out of the position shown in full lines into that shown in broken lines. This lifts lever $60^b$ carrying pawl $57^b$ while pawl $57^c$ holds the ratchet wheel 57. When the current impulse ceases, the wheel 57 is turned in the direction of the arrow by the tension spring $57^a$ and the time disc 52 is advanced one step, as with relay J. At the same time the motor gear and armature are moved back into the original position by the restoring pull of the spring. The time disc in this example is shown controlling the tariff relay of a double tariff meter M, placed in suitable relation to the branch mains $A^4$ and $A^5$, indicated as feeding a lighting circuit.

The entire system of control apparatus and relays works as follows: In the position of the parts shown in full lines in Figures 1 and 2 the control circuit is closed by the switch bridge 40, as follows, through branch E, switch 40, conductor B, and either B' or $B^2$ to the neutral conductor of the feeder; and the circuit therefore is incapable of being disturbed and in a certain sense is blocked. The time disc 30 at the central station rotates at a uniform speed in accordance with the movement of the clock work, and when the next abutting switch operating pin $32^b$ abuts against the finger $35^b$ of the spring switch, moves the contact tongue 38 to the left into the position $38^b$. Consequently the circuit of the motor 45 becomes closed through junction $a$, motor 45, wire $b$, contact $41^a$, segment 41, contact $41^b$, wire $c$, contact $38^d$, arm 38, contact $38^c$, and junction $d$, and the motor 45 sets the shaft 42 in motion by means of the spring coupling 43, the shaft thus turning about an angle of 90°, by which the bridge switch 40 is opened and the bridge switch 39 is closed.

The control circuit therefore now extends from the positive conductor over branch F, switch 39, contact 48, conductor B, and either B' or $B^2$ to the neutral conductor, so that the distant control relays J, J' become excited and, after cessation of the current impulse, the time disc of the same is moved forward one step.

When the shaft 42 has turned through an angle of 90° as described the contact segment 41 is moved out of the position shown in full lines in Figure $1^a$ into that shown in broken lines. The motor circuit is thus kept closed and the motor 45 therefore continues to run and causes by the direct medium of the tensioned spring coupling a second partial rotation of the shaft 42 about 90° whereby the switch bridge 39 is opened and the bridge 40 closed. The contact segment 41 now breaks the circuit, but it comes into contact with the contacts $41^c$ and $41^d$ thus again closing the motor circuit at this point in readiness for the next switch operation. The opening of the switch bridge 39 and the closing of the bridge 40 results in a restoration to original position and renewed blocking of the distant control relays by closing the control circuit on the neutral conductor.

The system remains under these conditions until after a certain interval another switch operation pin $32^a$ of the time disc of the clock switch C abuts against the finger $35^a$ of the spring switch 34 and moves the contact tongue 38 out of the position $38^b$ into the position $38^a$. The circuit of the motor 45 already prepared as mentioned above is now closed through junction $a$, motor 45, wire $b$, contact $41^c$, segment 41, contact $41^d$, wire $e$, contact $38^c$, arm 38, contact $38^c$, and junction $d$, and the motor again causes two consecutive switch movements, each about 90° as before, thus causing first the excitation of the distant control relays and then their blocking.

Since in Figure 1 the switch pins $32^a$ and $32^b$ follow each other at intervals of one hour, the switch operations, that is, the emission of each current impulse, takes place hourly. The time discs of the distant control relays are at each operation turned through one hour, and thus in 24 hours make a complete revolution, as does the time disc of the clock switch C in the station. As regards the distant control relays the trips 54 can be placed as desired at various switch times so that in an electric distribution network with periodically emitted current impulses, control operations can be carried out at various times. Thus, for example, the control of the tariff changing relays of double tariff meters, or the switching on and off of street lighting, or the restricting of heating circuits to certain times of day, may be fully controlled in point of time. Generally however it would be desirable not merely to send the current impulses every hour, as has been assumed above, but provision can advantageously be made for shorter periods of time, as short indeed as 5 to 10 minutes.

As already mentioned, a manual bridge switch 46 (Figure 1) is provided, by means of which, after moving the change-over switch 48 from contact $48^a$ to contact $48^b$, current impulses can be emitted at will for transmission to the distant control relays. In the condition of rest the relays are as before blocked by short circuiting the control circuit.

The change-over switch 49 may also be manually operated, and enables the motor driven main switch D to be manually controlled, so that after interruption of the current in the network the distant control relays can be manually operated at the proper times. The manually controlled electrical operation of the main switch D could also be mechanically effected by means of a mechanical hand controlled mechanism associated with the spring driving gear for temporary replacement of the clock switch, with provision for locking and releasing the spring driving gear.

Each of the time control relays 51, 51$^a$ is connected in circuit with one of the feeders, and may be constructed similarly to the corresponding distant control relay, with the difference however that they only serve for the purpose of time controlling. If all the connections in the network are in order and uninterrupted, then the time control relays are synchronized with the distant control relays, and with the position at any time of that switch operating pin of the clock switch C which has caused the last control impulse. They are connected in a manner similar to the distant control relays; in the condition of rest they are also blocked across the neutral conductor while during the switch operation they lie in the circuit from the positive side through F, B, and conductor G or G' to the neutral side.

In a case where, in one of the feeders A or A', the neutral line is interrupted at $y$ or $y'$, for example for repairs in the network, the distant control relays connected to the interrupted part of the network remain at rest, as does also the corresponding control relay 51 or 51$^a$ at the station. Assuming that the feeder A' has been interrupted on all sides at $x'$ and $y'$ and now is ready for being put into operation again, then before it is put into operation again the distant control relays on this part of the network and also the time control relay 51$^a$ should be advanced, i. e. should be synchronized with that switch operating pin on the clock switch C at the station which has caused the last preceding impulse to be emitted. This is effected by periodically emitting impulses through the isolated part of the network A' by means of the manual switch 50$^a$. The path of the control current for the distant control relays then passes from the positive wire of A' through conductor H', switch 50$^a$, conductor G', neutral wire, conductor A$^5$, motor 59, conductors B$^2$ B and E, and so back to the neutral wire, that is, its portion which is under tension; while the path for the time control relay is from the positive wire through conductor H', switch 50a, relay 51$^a$, conductors B and E, and so to the neutral or auxiliary conductor.

As soon as the time control relay 51$^a$ is advanced by repeated operations of switch 50$^a$ to the time corresponding to the position of that switch operating pin of the clock switch C which has produced the last impulse, then it will be known that the distant control relays are also advanced to the right hour, whereupon the knife switch and the fuses can be forthwith inserted to close the circuits at $y'$ and $x'$. The normal intermittent switch operation is now effected again automatically by the clock switch C.

In the case of an isolated auxiliary conductor this advancing of the relays to position can also be effected by means of a manual switch of the type of the switch 46, which is disposed in the appropriate auxiliary conductor, and which at each impulse first interrupts the intrinsically closed circuit of the distant control relays, connects the positive wire for imparting the impulse to the auxiliary conductor and finally again blocks the circuit; the current path being through the positive wire, auxiliary conductor, distant control relays, neutral wire, and also through the positive wire, auxiliary conductor, time control relay, neutral wire.

In the foregoing specification it is shown that a plurality of switch operations at various times can be effected in the distribution network while the clock switch C causes the current impulses to be sent out at regular intervals to cause the periodic advancement of the time discs at the distant control relays. Each distant control relay can thus be operated entirely independently of the switch or other operations of the working current circuits, because each of the trip devices 54 (Fig. 2) can be adjusted as desired on its time disc.

If a centralized distant control is desired with a minimum of current impulses for controlling a previously determined maximum number of reciprocal independent connections of the working circuits, then the time disc 30 of the clock switch C may be provided with pins or trips 32 and 32$^a$ positioned or adjustable to correspond to the switch timing. The emission of the current impulses can in this way be effected at any desired, instead of regular, intervals of time. Each current impulse will then advance all the distant control relays through the same angle. The pins or adjustable trips on the switch disc of the clock C are of such number and so disposed as to be in accordance with the previously determined maximum of rotary impulses per 24 hours at the operative relays, so that both the switch disc of the clock and also those of the distant control relays make a complete revolution once every 24 hours. Independently of the switch program determined at the station however, quite independent switch operations of the working circuits etc. can be effected by means of switch operating devices adjusted as desired at the distant control relays, thus allowing in this case one or more relay operations to be inoperative or delayed with respect to the working circuits to be controlled.

When there is over the whole network only one and the same switch program to be imparted to all the distant control relays, for instance single or multiple switching on and off of street lighting, it is sufficient to arrange pins 32 and 32$^a$ or adjustable trips on the time disc 30 of the clock switch C corresponding to the times of the switching on or off. In this case a simple electromagnet can serve as the distant relay, which at each current impulse reciprocates a spring switch by which the working circuit is switched off and on in alternate operations, such form of relay being known.

Figure 3 shows an arrangement of a station for sending out current impulses to the distant control relays which differs from that described in respect to Fig. 1 in that an automatic advancing switch apparatus is associated with the clock work or the motor for performing the function of the manual advancing switch 49. This advancing switch apparatus, whenever the current is interrupted in the incoming wires, gives out rapid consecutive current impulses to the distant control relays of the feeders connected to this station until these relays again are advanced to the same timing as that of the clock switch at the station. Since in Figure 3, except for the automatic additional switch apparatus, the parts are the same as in Figure 1 and perform the same functions, they will not all be described again here.

In the diagram of Figure 3 the shaft $31^a$ which drives the time disc 30 of the clock switch C is extended and carries two insulated slip rings 79, $79^a$, which lie in an auxiliary circuit with an auxiliary bridge switch mechanism 80, $80^a$, $80^b$. The rotary contact blade 80 of this auxiliary switch mechanism is fast on a shaft 81 but insulated therefrom, the latter being rotatably mounted on a plate 82. The plate 82 is fast on the free end of the extended clock shaft $31^a$ and therefore revolves with the same. At the other end of the shaft 81 is loosely carried a disc 83 provided with a finger $83^a$, which by means of a spring coupling 84 is connected to a disc 85 fast on the shaft 81, with which disc cooperates a spring connection 86. This arrangement provides for a snap operation of the switch blade 80.

The finger disc 83 is governed by a relay K comprising a time disc 87, for which purpose the latter is provided with switch projections 88 on its periphery into whose path the finger $83^a$ projects. The time disc 87 is driven in the same way as the above described distant control relays, that is to say the coil 89 of the electromagnet shown here by way of example, is excited by the current impulses sent out and the iron core 90 is thus attracted, the latter being released by the cessation of the impulse and by its return causing the switch wheel 91 to turn through a certain angle in the direction of the arrow. By gears the rotary motion of the switch wheel 91 is transmitted to the time wheel 87 which thus intermittently follows the uniform rotation of the time disc 30 of the clock C and that of the plate 82 and also therefore completes a whole revolution every 24 hours. There is no change in these conditions unless for some reason the network is no longer under tension, so that although the station clock C proceeds at a uniform speed the distant control relays and also the station relay K, comprising the time disc 87 and its operating means, are disconnected from the station clock switch C. After a short interval the plate 82 with the auxiliary switch 80, $80^a$, $80^b$, turning with the shaft $31^a$ of the clock switch, overtakes the now stationary time wheel 87 and the finger $83^a$ is turned by abutting against the projection 88 whereby the contact blade 80, which was hitherto open, is closed. The latter now remains in the closed position while the plate 82 proceeds on its rotary motion about the stationary time disc 87.

At the instant however when the network is again put under tension, a circuit comprising $a$, 45, $b$, $f$, $79^a$, $80^a$, 80, $80^b$, 79, $g$, $38^c$ and $d$ is closed, so that the motor 45 starts running again and operates the switch bridges 39 and 40, thus sending successive current impulses at short intervals into the network, acting to advance intermittently the distant control relays, and also the station relay K, until their synchronous relation with the station clock C is restored, which only occurs when the time wheel 87 has traveled so far as to actuate the finger $83^a$, whereby the finger disc 83 is again rotated so that the contact blade 80 is opened. Then all parts are again in normal operation. After the resulting advancement of the switch relays the motor 45 finally acts to open the closed switch bridge 39 and to close the bridge 40, thus putting the apparatus in a condition ready for emitting the next current impulse. In this case also instead of electrical means for controlling the advancing action, mechanical means can be associated with the switch bridge advancing gear.

The described system can be used with various systems of distribution. Each of the feeders A and A' in Fig. 1 is indicated as a 2-phase feeder, carrying the usual three conductors or wires. The invention however can be used as well on 3-phase systems or others, and in Fig. 3 is indicated a 3-phase system.

In Fig. 4 is shown another central control apparatus with automatic auxiliary switch apparatus, for a purpose similar to Figure 3. A similar time disc 30 of the station clock C is shown mounted on the shaft 31 and rotating with the same. An underneath switch disc 101 is shown, rotatable about the shaft 31, and provided with switch operating pins 32, $32^a$ at distances corresponding for example to one hour, similar to those on the time disc 30 in Figures 1 and 3. The switch disc 101 is driven by a coil spring 102 through intervening gears 103, and it has a stop 104 which normally abuts against an abutment $104^a$ attached to the time disc 30. Both discs 30 and 101 therefore normally rotate at the same speed so that the contact arm 38 of the spring switch 34 is moved alternately by the pins 32, 32ª into the positions 38ᵇ and 38ª.

To the spring switch 34 of the contact arm 38 is fastened a locking disc 105 with two locking teeth 105ª, 105ᵇ with which cooperates a locking fork 107 pivoted on the shaft 106. By a snap spring 108 the locking fork 107 is constantly urged towards its extreme positions. Between the shanks of the fork 107 is disposed an eccentric cam 110 pivoted on a shaft 109. These may be driven from the motor shaft 42 of the switch bridges, namely, through spur gears 111, auxiliary shaft 112 and bevel pinions 113. The cam 110 is rotated with an intermittent snap movement from the shaft 42 about an angle of 90°, and each time brings the locking fork 107 into the disengaged position with respect to the locking teeth 105ª, 105ᵇ, so that the spring switch with the contact tongue 38 can move freely alternately into the positions 38ᵇ and 38ª.

As soon however as the current for any reason is cut off from the station, the motor 45 ceases to work and the cam 110 therefore also remains stationary, for instance in the position illustrated. Consequently on the next movement of the spring switch with the contact tongue 38 into the position 38ᵇ, the fork 107 under the influence of the snap spring 108 on the shaft 106 is swung in a counter-clockwise direction, so that its upper locking tooth engages with the locking tooth 105ª and thus the contact tongue 38 is locked in the position 38ᵇ.

At the next abutment of a switch operating pin 32 of the switch disc 101, the pin is held up on the finger 35ª of the spring switch, thus rendering the disc 101 stationary, while the time disc 30 continues to rotate at uniform speed. An increasing relative rotation of the time disc 30 now takes place with respect to the switch disc 101 until the station is again under tension. Then the motor 45, whose circuit is closed through $a$, 45, $b$, 41, $c$, 38ᵈ, 38, 38ᵉ, and $d$, starts running, so that by its operating the switch bridges 39, 40 a current impulse is sent out to the distant control relays, while at the same time the cam 110 is snapped round in two steps each of 90°. The fork 107 is swung by the cam 110 about its axis 106 in a clockwise direction and its upper locking prong is caused to disengage from the locking tooth 105ª of the disc 105.

The switch disc 101 will now be moved by the spring 102 with respect to the time disc 30 at an accelerated speed, which may be limited by an escapement mechanism, not shown, so that the contact tongue 38 of the spring switch is reciprocated at a fairly high rate alternately into the positions 38ᵇ and 38ª, subject however to the above mentioned locking of the switch disc 101 in its intermittent movement during each period of impulse transmission. In this way a rapid succession of current impulses is transmitted to the distant control relays, which continues until the switch disc 101 has caught up and again engaged the time disc 30, with its stop 104 abutting against the abutment 104ª of the latter. From now on the apparatus runs normally again at the speed of the clockwork mechanism.

The actions described would take place in a similar way if, when an interruption occurs in the network, the contact tongue 38 of the spring switch is locked by the fork 107 in the position 38ª instead of the position 38ᵇ.

In case the switch bridges be driven by spring mechanism or the like (instead of by an electric motor) both the normal control of the switch disc 101 and also the additional control can be effected purely by mechanical means, in which case the circuits $a$, $b$, $c$, $d$, and $a$, $b$, $e$, $d$ are unnecessary.

While in the examples illustrated the relays are connected for operation by open circuit current they can of course also be operated by closed circuit current.

There have thus been described several electrical distant control systems providing the principles and attaining the objects of the present invention. Since various matters of operation, arrangement and construction may be modified without departing from the principles involved it is not intended to limit the invention to such matters except so far as set forth in the appended claims.

What is claimed is:

1. For the distant control of an electric distribution system having the working conductors extending from the central station to the distant places of current consumption and at each such distant place a control relay, the combination of a central controller comprising a control switch operable to establish a control circuit at various times and so transmit relay operating impulses, a control circuit including one of the working conductors and an auxiliary conductor connecting the central station with the relay, and the control switch having contacts which, when the switch returns to normal position, place the auxiliary conductor and relay in a no-voltage circuit; the control switch comprising a shaft carrying two switch bridges, one normally open the other normally closed, and both reversible upon rotation and thereupon restorable to normal.

2. In an electric distribution system for the distant control of contact apparatus, having working conductors extending from the central station to the distant places of current consumption and at each such distant place a control relay for the contact apparatus, the combination of a central primary drive mechanism, a central double-bridge control switch, one of its bridges being normally open, the other normally closed, a motor for actuating the control switch in dependence of the drive mechanism, a control circuit including one of the working conductors and an auxiliary conductor connecting the central station with the distant relays, said control switch having contacts connected to the working conductors and other contacts connected to said auxiliary conductor, such contacts so related to the bridges as to establish by one of them an impulse transmitting circuit for the operation of the distant relays and automatically thereafter by the other bridge a no-voltage circuit for locking purposes.

3. In an electric distribution system for the distant control of contact apparatus, having working conductors extending from the central station to the distant places of current consumption and at each such distant place a control relay for the contact apparatus, the combination of a central primary drive mechanism, a central double-bridge control switch, one of its bridges being normally open, the other normally closed, a motor for actuating the control switch in dependence of the drive mechanism, a control circuit including one of the working conductors and an auxiliary conductor connecting the central station with the distant relays, said control switch having contacts connected to the working conductors and other contacts connected to said auxiliary conductor, such contacts so related to the bridges as to establish by one of them an impulse transmitting circuit for the operation of the distant relays and automatically thereafter by the other bridge a no-voltage circuit for locking purposes, and manually actuable means for effecting similar operations to control the distant relays at will.

4. In an electric distribution system for the distant control of contact apparatus, having working conductors extending from the central station to the distant places of current consumption and at each such distant place a control relay for the contact apparatus, the combination of a central clock-operated drive mechanism, a central double-bridge control switch, one of its bridges being normally open, the other normally closed, a motor for actuating the control switch in dependence of the drive mechanism, a control circuit including one of the working conductors and an auxiliary conductor connecting the central station with the distant relays, said control switch having contacts connected to the working conductors and other contacts connected to said auxiliary conductor, such contacts so related to the bridges as to establish by one of them an impulse transmitting circuit for the operation of the distant relays and automatically thereafter by the other bridge a no-voltage circuit for locking purposes.

5. In an electric distribution system for the distant control of contact apparatus, having working conductors extending from the central station to the distant places of current consumption and at each such distant place a control relay for the contact apparatus, the combination of a central primary drive mechanism, a central double-bridge control switch, one of its bridges being normally open, the other normally closed, a motor for actuating the control switch in dependence of the drive mechanism, a control circuit including one of the working conductors and an auxiliary conductor connecting the central station with the distant relays, said control switch having contacts connected to the working conductors and other contacts connected to said auxiliary conductor, such contacts so related to the bridges as to establish by one of them an impulse transmitting circuit for the operation of the distant relays and automatically thereafter by the other bridge a no-voltage circuit for locking purposes, and mechanism for correctional operation of the control switch for synchronizing purposes.

6. In an electric distribution system for the distant control of contact apparatus, having working conductors extending from the central station to the distant places of current consumption and at each such distant place a control relay for the contact apparatus, the combination of a central primary drive mechanism, a central double-bridge control switch, one of its bridges being normally open, the other normally closed, a motor for actuating the control switch in dependence of the drive mechanism, a control circuit including one of the working conductors and an auxiliary conductor connecting the central station with the distant relays, said control switch having contacts connected to the working conductors and other contacts connected to said auxiliary conductor, such contacts so related to the bridges as to establish by one of them an impulse transmitting circuit for the operation of the distant relays and automatically thereafter by the other bridge a no-voltage circuit for locking purposes, and automatic means operable after current interruption for operating the control switch to send a rapid succession of impulses thereby to advance the distant relays into synchronism with the primary drive mechanism.

7. In an electric distribution system for the distant control of contact apparatus, having working conductors extending from the central station to the distant places of current consumption and at each such distant place a control relay for the contact apparatus, the combination of a central clock-operated drive mechanism, a central double-bridge control switch, one of its bridges being normally open, the other normally closed, a motor for actuating the control switch in dependence of the drive mechanism, a control circuit including one of the working conductors and an auxiliary conductor connecting the central station with the distant relays, said control switch having contacts connected to the working conductors and other contacts connected to said auxiliary conductor, such contacts so related to the bridges as to establish by one of them an impulse transmitting circuit for the operation of the distant relays and automatically thereafter by the other bridge a no-voltage circuit for locking purposes, said central drive mechanism comprising a revolving time disk together with an auxiliary switch movable therewith, an auxiliary circuit for the driving motor of the control switch, arranged to be controlled by said auxiliary switch, and means to actuate the latter by the difference in position between the central drive mechanism and the distant control relays.

8. For the distant control of an electric distribution system having the working conductors extending from the central station to the distant places of current consumption and at each such distant place a control relay, the combination of a central controller comprising a control switch operable to establish a control circuit at various times and so transmit relay operating impulses, a control circuit including one of the working conductors and an auxiliary conductor connecting the central station with the relay; the central controller comprising means operating the control switch at designated times and automatically thereupon returning it to normal or no-voltage position; and the control switch comprising two switch devices, one normally open and the other normally closed, and both reversible upon operation and thereupon restorable to normal, with contacts which, when the switch returns to normal position, place the auxiliary conductor and relay in a no-voltage circuit.

In testimony whereof, I have affixed my signature hereto.

ERNST BODER.